No. 628,039. Patented July 4, 1899.
E. O. ROOD & J. HELT.
TILE LAYING MACHINE.
(Application filed Feb. 25, 1898.)
(No Model.)
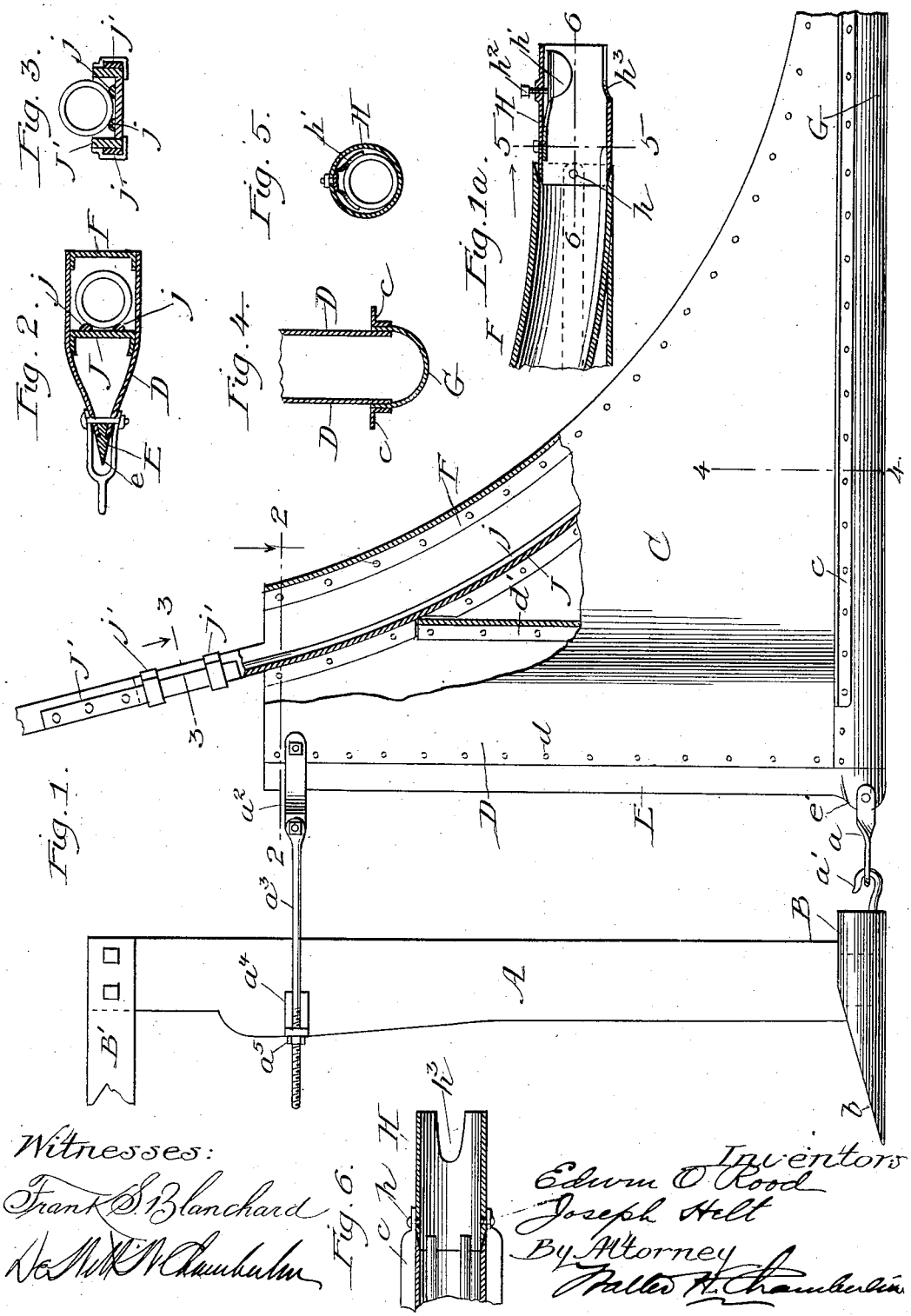
Witnesses:
Frank S. Blanchard
DeWitt N. Chamberlin
Inventors
Edwin O. Rood
Joseph Helt
By Attorney
Walter H. Chamberlin

UNITED STATES PATENT OFFICE.

EDWIN O. ROOD, OF BRITT, AND JOSEPH HELT, OF PELLA, IOWA.

TILE-LAYING MACHINE.

SPECIFICATION forming part of Letters Patent No. 628,039, dated July 4, 1899.

Application filed February 25, 1898. Serial No. 671,550. (No model.)

*To all whom it may concern:*

Be it known that we, EDWIN O. ROOD, residing at Britt, in the county of Hancock, and JOSEPH HELT, residing at Pella, in the county of Marion, State of Iowa, citizens of the United States, have invented certain new and useful Improvements in Tile-Laying Machines; and we declare the following to be a full, clear, and exact description of the invention, such as will enable others skilled in the art to which it pertains to make and use the same, reference being had to the accompanying drawings, which form a part of this specification.

Our invention has for its object the production of a tile-laying machine—that is, a machine for laying a tile under the surface of the ground.

It consists in a combination of devices and appliances hereinafter described and claimed.

In the drawings, Figure 1 is a side elevation, with parts in section, of our apparatus. Fig. 1$^a$ is a section of the lower end of our apparatus broken away from Fig. 1. Fig. 2 is a section on the line 2 2 of Fig. 1 looking in the direction of arrow. Fig. 3 is a section on line 3 3 of Fig. 1 in direction of arrow. Fig. 4 is a section on line 4 4 of Fig. 1. Fig. 5 is a section on line 5 5 of Fig. 1$^a$ in direction of arrow. Fig. 6 is a section on line 6 6 of Fig. 1$^a$.

In carrying out the invention, A represents a knife-shaped cutter provided on its lower end with the cylindrical-shaped mole B, and on its upper end is attached the pole B'. The forward end of this mole is beveled downward toward its point, as at $b$. Back of the cutter A is the tile-carrying portion C, made up of two sheets D, brought together at their forward ends and riveted at $d$ to a bar E and at the back to the curved channel-iron F. The bar E is knife-shaped, as shown at $e$, Fig. 2, the lower end $e'$ being swelled slightly. Suitable braces, such as $d'$, are provided, as shown in Fig. 1, to hold the plates in place.

The bottom plate G is curved and suitably engaged to the plates D. Extending from front to rear on either side of the portion C are the flanges or ribs $c$, made of angle-iron and engaged by riveting to the side and bottom plates D G.

The lower end H of the tile-carrying portion C is circular in cross-section, as shown in Figs. 5 and 6, and is pivotally engaged thereto by the pivots $h$, extending through the ribs $c$. Engaged to the upper part of H is a spring $h'$, an adjusting-screw $h^2$ being provided to regulate the tension of the same. The lower part is cut away, as at $h^3$, for a purpose hereinafter explained.

J is a curved way provided with two ribs or tracks $j$, on which the tiles rest.

J' is an extension of the way J, detachably secured thereto by the collars $j'$ $j'$, as shown in Figs. 1 and 3.

The tile-carrying portion C is connected to the cutter A at the bottom by means of the strap $a$, pivoted to the bar E, and hook $a'$ on the mole B, and at the top by the pivoted strap $a^2$ and bolts $a^3$, pivoted to said strap and extending forward on each side of the cutter A, where they are held by a yoke $a^4$ and nuts $a^5$. Thus the said upper connection will yield in one direction, while its movement in the opposite direction is adjusted by the nuts $a^5$.

The operation of our apparatus is as follows: At the point where it is desired to start the line of tile a hole is dug in the ground and the machine placed therein and the tile-carrying portion C filled by placing the tile on the way J and extension J'. Suitable power is attached to the pole B' and the apparatus drawn forward, the cutter A acting as a guide by cutting the earth in advance of the tile-carrying portion C, which follows and parts the earth on each side. The tendency of the beveled face of the mole B is to force the cutter A into the ground; but this is overcome and the desired height of the apparatus regulated by means of the raising or lowering of the outer end of the pole B', together with the adjusting of the length of the connection at the top by means of the nuts $a^5$. As will be seen, when the pole B' is raised, the upper end of the cutter is free to move toward the tile-carrying portion as the screw ends of the bolts $a^3$ pass through the yoke $a^4$. The tile-carrying portion is thus drawn forward by the connection at the bottom until the mole B and tile-carrying portion are in the same horizontal plane. As the apparatus advances the tile are discharged from the lower end H, the spring $h'$ pressing them into the opening $h^3$, so that the end of the tile will bear on the ground before it has left the tile-carrying portion C. By this means the tile are fed from the apparatus in a straight line with the ends abutting. As will be seen, the tile-carrying portion will follow after the cutter as it is drawn through the ground; but any quick change in a direction up or down of the tile-carrying portion is prevented by the flanges c on each side engaging with the earth.

An important feature of our invention is the provision of the flexible connection between the cutter and tile-carrying portion, as by this means the cutter may be sharply depressed or elevated without necessitating a quick change in direction of the tile-carrying portion, the latter following the former and enlarging and straightening the hole cut. Any tilting of the main portion and consequent raising of the discharge end is compensated for by the pivoting of the portion H to the main portion, as the portion H will at all times rest on the bottom of the cut, and thus discharge the tile directly on the ground.

It will be seen that our device is especially applicable for use in soft or wet ground where the earth has a tendency to quickly fill the hole, since the tile rest on the ground and are held in place by the spring until left by the machine. It will also be observed that the spring $h'$ has downwardly-projecting ears or flanges, the purpose of which is to prevent the tile from rolling out of alinement as the spring presses the tile through the opening $h^3$. Thus tiles are being deposited on the ground in alinement with each other, the spring $h'$ being the last part to leave the tile.

What we claim is—

1. In an apparatus of the class described, a cutter and a tile-carrying portion flexibly engaged thereto at the top and bottom and means for adjusting the length of the connection at the top, substantially as described.

2. In an apparatus of the class described, the combination with the cutter the tile-carrying portion and a flexible connection between the two at the bottom, of a pivoted connection at the top adapted to yield in one direction and to hold in the opposite direction, substantially as described.

3. In an apparatus of the class described, a tile-carrying portion provided with a way down which the tile are fed, the lower end of said way being pivotally engaged to the main portion, substantially as described.

4. In an apparatus of the class described, the combination of a way down which the tiles are fed of means for centering and discharging said tiles in a straight line, substantially as described.

5. In an apparatus of the class described, a tile-carrying portion provided at its discharge end with a pivoted section, the latter carrying a plate adapted to bear on the top of the tile and an opening beneath said plate, substantially as described.

6. In an apparatus of the class described, a tile-carrying portion provided at its discharge end with a pivoted section, the latter carrying a spring adapted to bear on the top of the tile and an opening beneath said spring, substantially as described.

7. In an apparatus of the class described, a tile-carrying portion provided at its discharge end with a plate adapted to bear on the top of the tile, said plate having depending ears to prevent the tile rolling laterally, substantially as described.

In testimony whereof we sign this specification in the presence of two witnesses.

EDWIN O. ROOD.
JOSEPH HELT.

Witnesses as to Edwin O. Rood:
  WALTER H. CHAMBERLIN,
  DE WITT W. CHAMBERLIN.
Witnesses as to Joseph Helt:
  JOHN H. STUBENRAUCH,
  P. G. GAASS.